INVENTORS
JEROME L. DEBOO
GEOFFREY B. LUTZ
BY R. C. Terry
ATTORNEY

July 9, 1968     J. L. DE BOO ET AL     3,392,293

ELECTROMAGNETIC STEPPING MOTOR

Filed Dec. 29, 1964     3 Sheets-Sheet 2

United States Patent Office 3,392,293
Patented July 9, 1968

3,392,293
ELECTROMAGNETIC STEPPING MOTOR
Jerome L. De Boo, Barrington, and Geoffrey B. Lutz, Evanston, Ill., assignors to Teletype Corporation, Skokie, Ill., a corporation of Delaware
Filed Dec. 29, 1964, Ser. No. 421,887
13 Claims. (Cl. 310—49)

ABSTRACT OF THE DISCLOSURE

A stepping motor having a rotor in the form of a spoked wheel driven by axially aligned stator electromagnets located on each side of the rotor and which cause the rotor to rotate in predetermined incremental angular amounts under the control of a series of successive pulses from an electronic control circuit which supplies the pulses in a predetermined pattern to different groups of electromagnets.

---

A need has arisen in the telegraph art for a high speed stepping motor for driving the tape in a high speed telegraph tape reader at the rate of 200 to 300 steps per second. Ideally, a stepping motor for operation at such high rates of speed should have as few moving mechanical parts as possible. As a consequence, electromagnetic stepping motors appear to be the best suited for high speed operation. Electromagnetic stepping motors which exist in the prior art generally have a rotor with a plurality of equally spaced electromagnetic pole responsive elements or teeth arranged around its circumference or outer periphery.

The stator, comprising a plurality of stator poles or electromagnets arranged to cooperate with the pole responsive elements of the rotor, then encircles the rotor; so that to use such a motor to drive the tape in a telegraph tape reader, a separate tape feed wheel, driven by the rotor shaft, must be provided.

The mass to be moved by the electromagnets of the stator in this type of motor is relatively great since the rotor, its shaft, and the tape feed wheel all must be rotated for each step. The power required to provide incremental or stepped rotation of a large mass is much greater than the power required to step a low mass, so it is desirable to reduce the mass to be stepped as far as is practical.

Accordingly, it is an object of this invention to provide a new and improved stepping motor.

It is another object of this invention to provide an electromagnetic stepping motor having a minimum number of moving parts.

It is yet another object of this invention to provide a high speed electromagnetic stepping motor in which the mass to be moved is low.

It is still another object of this invention to arrange the stator and rotor elements in a stepping motor to allow the output of the motor to be taken directly from the outer periphery of the rotor.

It is a further object of this invention to provide an electromagnetic stepping motor in which the rotor has a plurality of magnetic spokes which cooperate with stator elements on each side of the rotor to produce selective precise incremental rotation of the rotor upon sequential energization of preselected ones of the stator elements.

It is a more specific object of this invention to provide a stepping motor in which a pair of stators having a plurality of electromagnets thereon are axially displaced from the rotor to cause precise incremental rotation of the rotor upon selective energization of diametrically opposite sets of electromagnets on each side of the rotor to form a closed magnetic flux path through corresponding spokes of the rotor.

These and other objects of the invention are accomplished in a stepping motor in which the rotor of the motor also functions as a tape feed wheel and has feed pins for driving the tape mounted on its periphery. This combination rotor and tape feed wheel is constructed in the configuration of a spoked wheel with a plurality of spokes made of magnetic material radiating from the hub of the wheel to the rim. The angular displacement between adjacent spokes is made equal.

Mounted in parallel coaxial relation with the feed wheel are a pair of stator elements each having a plurality of pairs of flux coupled electromagnets radially arranged about the axis of rotation and mounted to cooperate with the spokes of the rotor. The degree of angular displacement between the electromagnets of each pair is the same as the degree of angular displacement of the spokes with the degree of angular displacement between electromagnets of different pairs being greater than the degree of angular displacement of the spokes. The electromagnet pairs on the stators on opposite sides of the rotor are axially aligned with one another to form a "set" of electromagnets, each set constituting two pairs of oppositely aligned electromagnets, one pair on each stator. The electromagnets of each set have their windings interconnected; so that when a set is energized, a closed magnetic flux path is completed through adjacent spokes of the rotor to pull those spokes into alignment with the energized electromagnets and to hold the rotor in the position to which it was stepped by energization of the set.

In order to provide for faster and more efficient operation, a plurality of these sets of electromagnets (at least three sets located 120° apart) are energized simultaneously, so that a plurality of spokes (6) of the rotor are acted upon simultaneously to provide positive and balanced driving of the rotor. Three interconnected sets is the minimum number needed to obtain reversibility of the motor. These interconnected sets form a "group" of electromagnets; and in the preferred embodiment of this invention, three such groups are sequentially energized under the control of a three stage reversible ring counter, with the output of each stage being connected to a different group of electromagnets. The relationship between the angular displacement of electromagnets of different groups is such that when one group is energized and the spokes of the rotor cooperating with that group are in direct alignment with the electromagnet pairs forming the group, the next magnet group to be energized is just slightly offset from the corresponding cooperating spokes for that magnet group. Thus when the ring counter steps to the next step energizing this next group of electromagnets, the magnetic flux path established through each of the sets of that group acting in close proximity to the offset spokes of the rotor causes those spokes to be pulled into alignment with the electromagnets of that group, advancing the rotor an incremental step.

The motor may be instantaneously reversed at any step by reversing the direction in which the stages of the ring counter are operated, since the electromagnet groups both preceding and following the previously energized group are offset from their corresponding spokes of the rotor in the same amount but in the opposite direction.

It should be noted that the apparatus of the preferred embodiment of this invention comprises a stepping motor in which the angular displacement between electromagnets of different groups is chosen to be different from an integral multiple of the angular displacement between adjacent spokes while the angular displacement between electromagnets of the same group is chosen to be an integral multiple of the angular displacement between adjacent spokes. In the preferred embodiment of the invention it will be noted that the rotor has 21 spokes and each stator has 18 electromagnets arranged into 9 pairs which cooperate with the same number of electromagnets on the opposite stator, with three pairs of electromagnets on each stator being utilized in each group for simultaneous energization. The number of spokes in the rotor and the number of electromagnets on the stators may be more or less than those shown in the preferred embodiment and the number of spokes in the rotor may be equal to, less than, or greater than the number of stator electromagnets, the required angular relationships being readily ascertainable by those skilled in the art.

Other objects and features of this invention will become apparent to those skilled in the art upon consideration of the following specification taken in conjunction with the drawings in which.

Throughout all the figures of the drawings the same reference numerals are used to designate the same elements.

Figure 1:
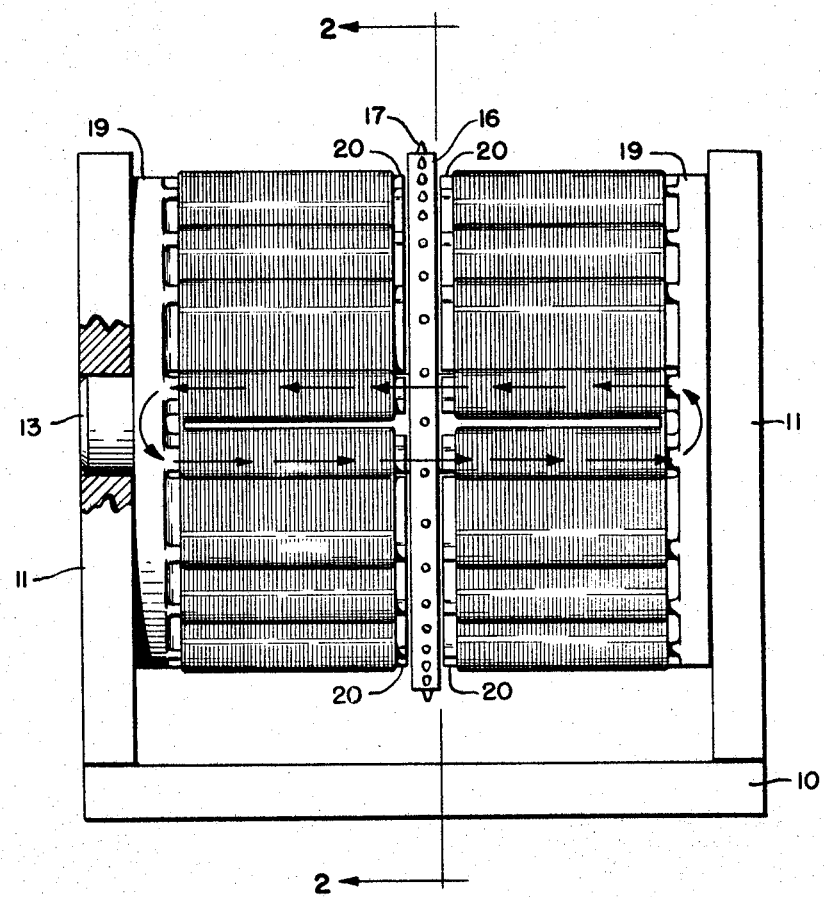
FIG. 1 is a front view of a stepping motor made in accordance with a preferred embodiment of this invention.

In a preferred embodiment of this invention as shown in FIGS. 1 to 4, a base 10 which carries at each end a vertical side member 11 is provided for supporting the motor. A combination rotor and feed wheel 12 constructed in the general configuration of a wagon wheel is rotatably mounted on a fixed shaft 13 (FIG. 2) which is supported by the members 11. The combination rotor and feed wheel 12 best may be seen in FIG. 3 and has a hub 14 and spokes 15 made of magnetic material (such as steel) and a rim 16 made of nonmagnetic material (such as aluminum) which may be heat shrunk onto the spokes to form the finished combination rotor and feed wheel. A plurality of teeth or feed pins 17 for advancing a perforated telegraph tape are equally spaced about the periphery of the wheel.

Mounted in parallel coaxial relationship with the rotor 12 and on opposite sides of it are a pair of stator members 18 (of the type shown in FIG. 4) made of magnetic material having a high magnetic permeability (such as steel). The base portion 19 of each of the stator elements 18 comprises a common magnetic flux return path from which a plurality of electromagnet core elements 20 extend toward the rotor 12. The core elements 20 are radially arranged about the shaft 13 and axially spaced from the rotor 12 by a small air gap which may be seen clearly in FIG. 1. The shape of each core element 20 is chosen to conform to the shape of the spokes 15 of the rotor.

The core elements 20 further are arranged into pairs, the core elements of each pair being angularly displaced from one another by an angle $\alpha$ which is equal to the angle of displacement between adjacent spokes of the rotor. A slightly larger angle $\beta$ separates adjacent core elements 20 which belong to different pairs.

The opposing stator elements 18 mounted on each side of the rotor 12 are placed so that each pair of core elements on each stator 18 is directly axially aligned with a corresponding pair of core elements on the opposing stator element 18. Each of the core elements 20 then carries an electromagnet winding 21 (FIG. 1) with the windings on the core elements 20 of each pair being wound in the opposite direction and connected in series; so that when these windings are energized, the pair of core elements acts as a U-shaped electromagnet with the flux passing through the core elements 20 and the base portion 19 of the stator element 18. The windings on each of the pairs of core elements 20 also are connected in series with the windings on the diametrically opposite pair of core elements 20 to form a set of electromagnets, with the directions in which the windings of the set are wound being such as to provide a closed magnetic flux path through corresponding spokes of the rotor as indicated by the arrows in FIG. 1 when the windings of a set of electromagnets are energized.

The magnetic flux path which is completed through adjacent spokes of the rotor 12 by an energized set of electromagnets pulls those spokes into alignment with the energized electromagnets and holds the rotor in the position to which it was stepped by the energization of the set. In order to increase the speed and efficiency of operation of the motor, three sets of electromagnets are energized simultaneously; so that six spokes 15 of the rotor 12 are acted upon simultaneously to provide a positive and balanced driving of the rotor 12. These interconnected sets form a group of electromagnets with each of the sets of the groups being separated by an angle $\gamma$, which is 120° in the preferred embodiment. The particular number of sets utilized to form a group of electromagnets may be varied so long as the angle $\gamma$ is an integral multiple of the angle $\alpha$ which is the angular displacement between adjacent spokes 15 on the rotor 12.

Figure 2:
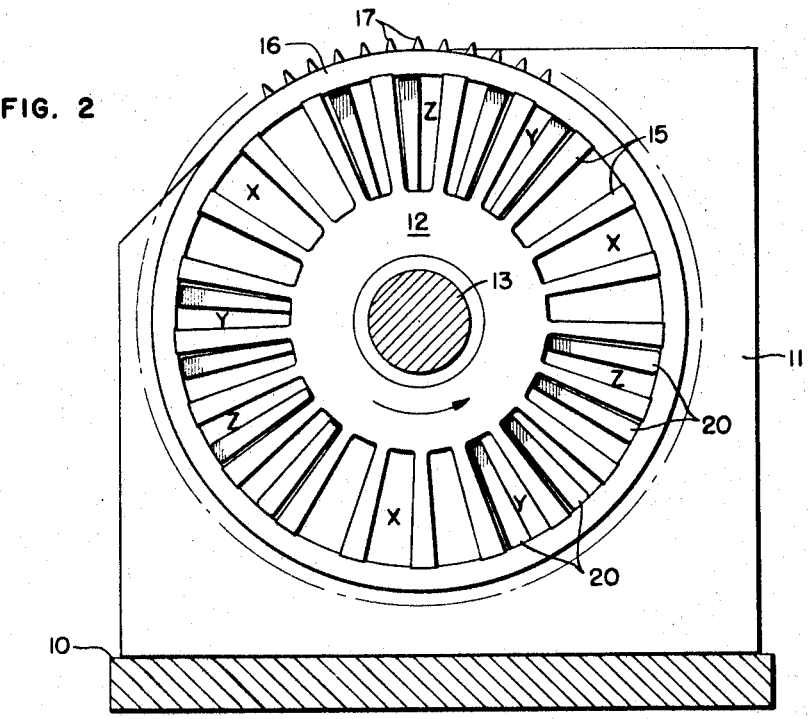
FIG. 2 is a cross sectional side view of the motor shown in FIG. 1 taken along line 2—2.
Figure 3:
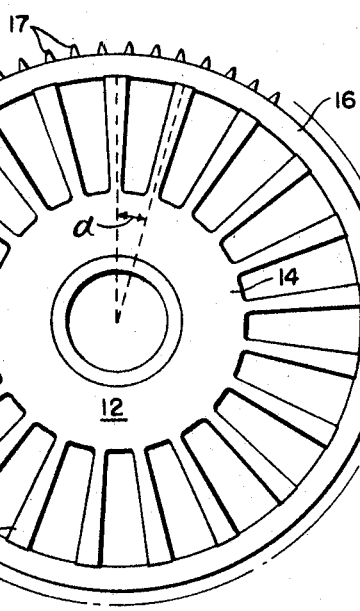
FIG. 3 shows the combination rotor and tape feed wheel.
Figure 4:
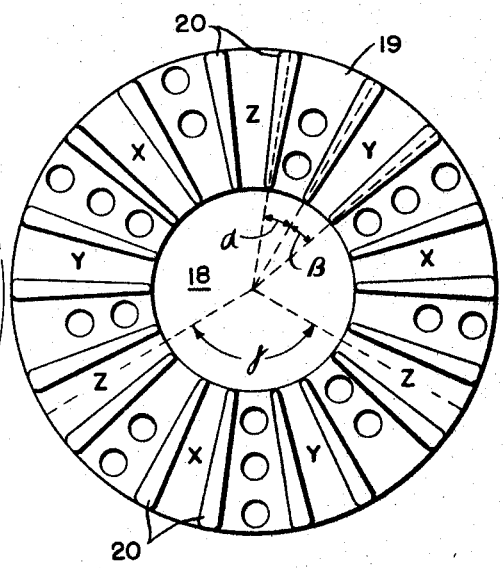
FIG. 4 shows a pole piece for one of the stators of the motor.

In FIGS. 2 and 4 the pairs of core elements 20 of the groups of electromagnets are identified by the letters X, Y and Z with all the magnet pairs of each group being designated by the same letter. As stated previously, the groups of electromagnets are sequentially energized at the desired stepping rate of the motor in order to rotate the rotor 12. In FIG. 2 the electromagnet group X may be assumed to be energized causing the spokes 15 which cooperate with the electromagnet core elements 20 of the group X to be in direct alignment overlying the core elements 20.

For the purposes of illustration, assume that it is desired to step the rotor 12 in a counterclockwise direction as indicated by the arrow in FIG. 2. In such a situation the next group of electromagnets to be energized is the group Y, the core elements 20 of which may be seen in FIG. 2 through the spaces between the spokes 15 in the rotor 12 with the core elements 20 of the group Y being slightly offset from the corresponding spokes in a leading direction (assuming counterclockwise rotation of the rotor 12). When the next step is desired, the windings 21 on the electromagnet core elements 20 of the group Y are energized, and the strong magnetic flux established between the opposing pairs of core elements 20 in the three sets of the group Y attracts the adjacent spokes 15 of the rotor 12. The rotor rapidly rotates in the direction of the arrow until the spokes 15 which were adjacent to the core elements 20 of the group Y directly overlie the core elements 20 of that group. The rotor 12 then will be held in this new position until energization of the group Z occurs and the electromagnets of the group Y are released for the next step.

In order to continue counterclockwise stepped rotation of the rotor 12, sequential energization of the groups will continue in the order X–Y–Z–X–Y–Z in the manner described previously for progressing from energization of group X to energization of group Y. If at any time reversal of the direction of rotation of the rotor 12 is desired, it merely is necessary to reverse the sequential order in which the groups are energized, that is to reverse the order of energization from X–Y–Z–X–Y–Z to Z–Y–X–Z–Y–X.

As may be clearly seen in FIG. 2 if instead of energizing group Y following energization of group X, group Z had been energized, the rotor would have stepped one step in the clockwise direction since the core elements 20 of group Z are offset from their corresponding spokes 15 of the rotor 12 the same amount in the clockwise direction as the electromagnet cores 20 of the group Y are offset from their corresponding spokes 15 in the counterclockwise. With this arrangement instantaneous reversal of the direction in which the rotor 12 is stepped may be effected at any time merely by changing the order of sequential energization of the groups.

It should be emphasized that in order to provide the foregoing type of operation, the angle α between the electromagnet core elements 20 of each pair must be the same as the angle between adjacent spokes 15. The angle β between core elements 20 of adjacent pairs of core elements is chosen to be slightly greater than the angle α and is not an integral multiple of the angle α, whereas the angle γ is an integral multiple of the angle α, in the preferred embodiment being equal to seven times α.

Figure 5:
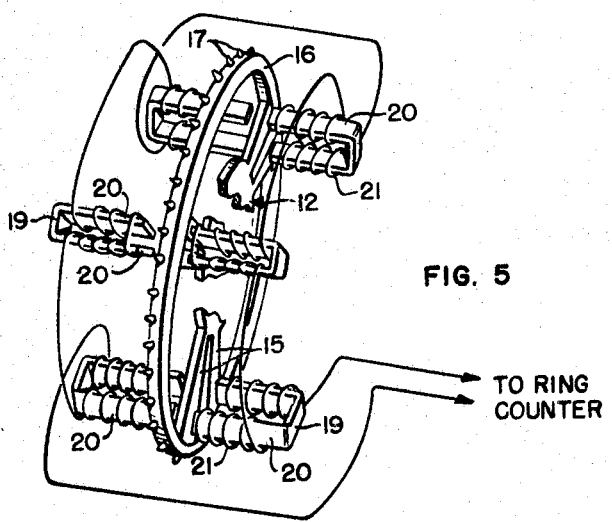
FIG. 5 is a fragmentary perspective view useful in explaining the operation of the motor.

FIG. 5 shows in diagrammatic form a single group of electromagnets and its relationship to the rotor 12. As may be clearly seen in FIG. 5, the windings 21 on each of the six pairs of electromagnets constituting the group are connected in series, with the windings being wound around their corresponding core elements 20 in such a way as to cause the flux flowing through each set of opposing electromagnets to be in a closed loop of the type indicated by the arrows in FIG. 1. When a signal is supplied from a ring counter (to be described subsequently) through the windings 21 of all of the core elements 20 of the group, the corresponding spokes 15 are pulled into direct alignment between the opposing core elements 20 of each of the sets of magnet pairs of the group as previously described. Only a single group has been shown in FIG. 5 for the purpose of clarity; but, as described previously, two other similar groups are provided for stepping the rotor 12. Each of these groups is connected to a different stage of a ring counter in the same manner as the group shown in FIG. 5 with only one such group being energized at a time and with the groups being energized sequentially to provide stepping of the rotor in the desired direction. Each time a group is energized, the corresponding spokes 15 of the rotor 12 adjacent the core elements 20 of the energized group are pulled into alignment with the core elements 20 of that group to rotate the rotor 12 one incremental step.

Figure 6:
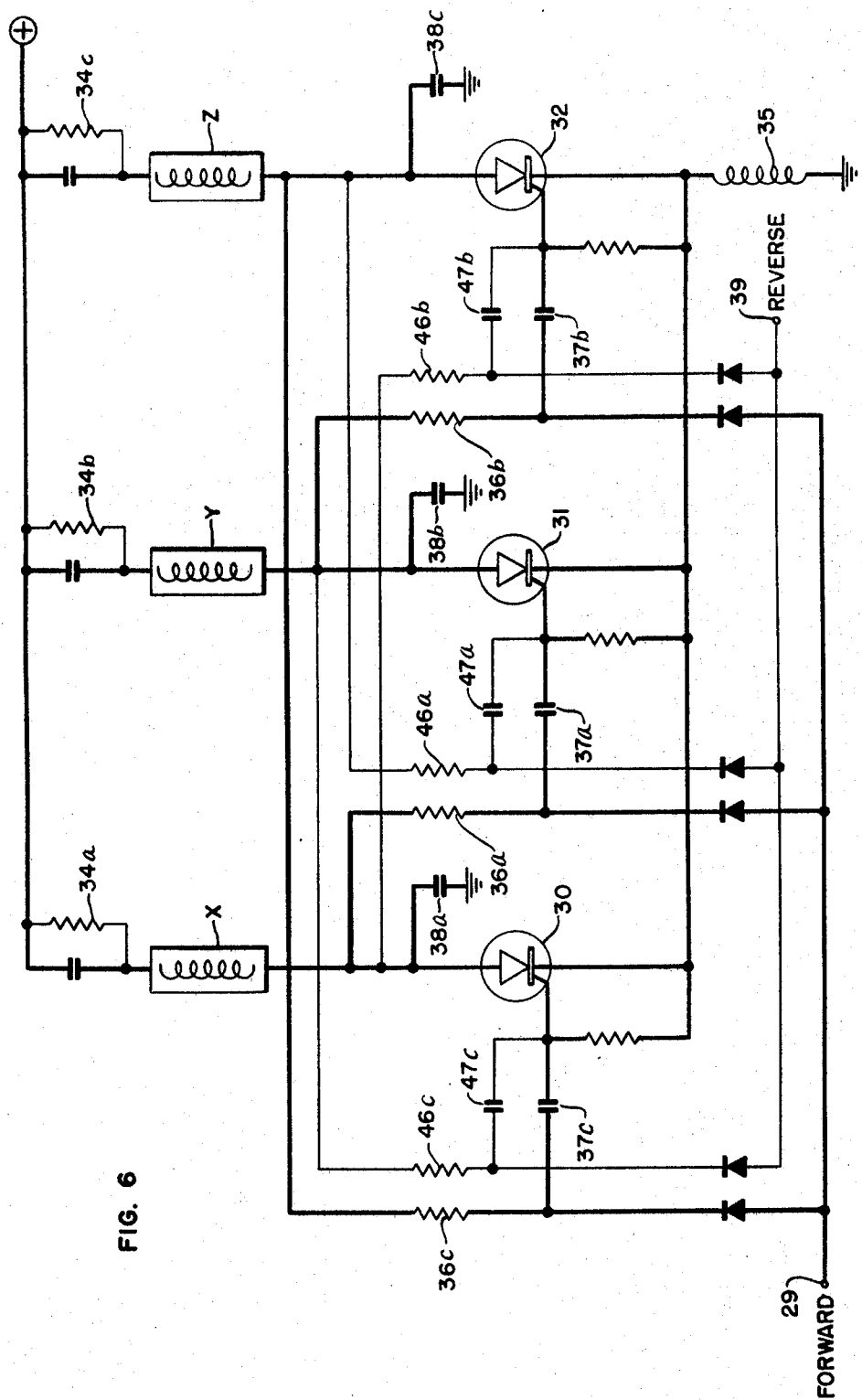
FIG. 6 is a circuit diagram of a ring counter which may be used to drive the motor.

Referring now to FIG. 6 there is shown one type of reversible ring counter which may be utilized to drive the windings 21 of the three groups of electromagnets shown in the preferred embodiment of the invention. It should be noted that any suitable reversible ring counter may be used and that the invention in no way depends upon the particular type of ring counter shown in FIG. 6 for its operation.

Since each stage of the ring counter must be utilized to energize 12 electromagnet coils in the preferred embodiment of this invention, it is necessary to provide a counter which is capable of handling relatively large amounts of power. For that reason the active elements of the ring counter shown in FIG. 6 are silicon controlled rectifiers 30, 31 and 32. Three stages are provided since only three groups, X, Y and Z, of electromagnets are to be driven in the preferred embodiment of this invention. Of course, if a different number of groups of electromagnets is utilized, a correspondingly different number of stages should be provided in the ring counter. The groups of electromagnets X, Y, Z are shown in a diagrammatic form in FIG. 6 and are connected in series with the silicon controlled rectifiers 30, 31 and 32, respectively.

For the purposes of illustration, assume that the silicon controlled rectifier 30 is conductive initially. When this occurs, current flows through the electromagnets of group X, energizing that group. This current flows from a source of positive potential 33 through a current limiting resistor 34a, through the group of electromagnets X, the silicon controlled rectifier 30 and a coil 35 to ground to hold the electromagnets of the group X energized. At the same time, a priming potential (ground) is applied from the anode of the silicon controlled rectifier 30 through coupling resistors 36a and 46b to the trigger capacitors 37a and 47b which are connected to the gates of the silicon controlled rectifiers 31 and 32, respectively. The positive potential on the anodes of the nonconductive stages 31 and 32 also is applied through similar circuits to the trigger capacitors 37b, 47c and 37c, 47a, respectively, and fully charges those capacitors through the limiting resistors 36b, 36c, 46a and 46c.

Now assume that it is desired to drive the motor in the counterclockwise or forward direction (as viewed in FIG. 2). Positive trigger pulses are applied to the "forward" input terminal 29 of the counter, and the portion of the circuit outlined in the heavy lines functions to step the counter while the portion of the circuit outlined in the light lines has no effect on the circuit. When the first positive pulse is applied to the terminal 29, it is passed by the primed capacitor 37a to the gate of the silicon controlled rectifier 31 to trigger the silicon controlled rectifier 31 into conduction. Since the capacitors 37b and 37c are fully charged, as stated previously, this trigger pulse is blocked by those capacitors and has no effect on the silicon controlled rectifiers 30 and 32. The silicon controlled rectifier 31 is rendered conductive by the trigger pulse, and conduction initially is maintained through the silicon controlled rectifier 31 by the discharge of the capacitor 38b which previously was charged when the rectifier 31 was nonconductive.

The capacitors 38a to 38c are necessary in order to provide sufficient current to maintain the silicon controlled rectifiers 30 to 32, respectively, conductive during the initial interval when current begins to build up through the groups of electromagnets connected to the silicon controlled rectifiers. The discharge of the capacitor 38b through the silicon controlled rectifier 31 initially is opposed by the coil 35 and causes the previously conducting silicon controlled rectifier 30 to be momentarily back biased thereby rendering the silicon controlled rectifier 30 nonconductive. The silicon controlled rectifier 32 also is back biased by the discharge of the capacitor 38b, but since the rectifier 32 already is nonconductive and was not triggered into conduction by the trigger pulses, this discharge is of no effect. The current flowing through the group of electromagnets Y rapidly reaches a steady state value and the silicon controlled rectifier 31 remains conductive until the application of the next trigger pulse. When the next trigger pulse is applied at input 29, the silicon controlled rectifier 32 is triggered into conduction in a manner similar to that previously disclosed for triggering the silicon controlled rectifier 31 into conduction. At the time the silicon controlled rectifier 32 initially is rendered conductive, the capacitor 38c discharges through it and back biases the silicon controlled rectifier 31 turning it off.

So long as pulses continue to be applied at input 32, the ring counter continues to step in the forward direction causing the groups of electromagnets to be energized in the sequence X–Y–Z. If at any time it is desired to reverse the direction of the ring counter of FIG. 6, pulses are applied to the reverse input terminal 39 and no pulses are applied to the terminal 29. A circuit which is similar to that connected to the forward input terminal 29 is provided for the reverse input terminal 39 and is outlined in light lines in FIG. 6. The connections from the anodes of each of the silicon controlled rectifiers 30 to 32 to the trigger capacitors 47a to 47c of the other stages are the reverse of those previously described for stepping the counter in the forward direction; that is, the potential on the anode of the silicon controlled rectifier 30 is applied to the trigger capacitor 47b connected to the gate of the silicon controlled rectifier 32, the potential on the anode of the silicon controlled rectifier 31 is applied to the trigger capacitor 47c connected to the gate of the silicon controlled rectifier 30, and the potential on the anode of the silicon controlled rectifier 32 is applied to the trigger capacitor 47a connected to the gate of the silicon controlled rectifier 31. The operation of the circuit in the reverse direction is identical in all respects to the operation in the forward direction except that the counter stages are sequentially energized in the reverse order of that previously described for pulses applied to the input terminal 29. The reference numbers 46a to 46c and 47a to 47c have been applied to the components associated with the reverse direction circuit, and these numbers correspond to the reference numbers 36a to 36c and 37a to 37c used in identifying the components for operating the circuit in the forward direction.

As stated previously the invention is not limited to use of the ring counter shown in FIG. 6, but any suitable ring counter may be used. In view of the fact that a large number of electromagnets are energized from the output of each stage of the counter it may be desirable to provide additional amplification stages for the outputs of standard ring counters if they are substituted for the ring counter shown in FIG. 6. In any event the operation of the motor is the same irrespective of the type of counter circuit used.

Although the foregoing description of the motor of this invention has defined the rotor as being a spoked wheel, the rotor could be made in the form of a disc of non-magnetic material having a plurality of inserts of magnetic material placed in it instead of the spokes described in conjunction with the preferred embodiment. The spoked wheel was chosen since it provides the most efficient configuration in a limited space. It also is desirable that the stators be placed as close to the rotor as possible without touching the rotor. The limit to the space between the stator and the rotor is established by the mechanical tolerances of the bearings supporting the rotor and by the rigidity of the rotor since any mechanical deflection of the rotor must be less than the air space between the rotor and stator.

Although in the preferred embodiment of the invention the rotor is described as being rotatably mounted on a fixed shaft in order to reduce the mass to be rotated, the rotor and shaft may be rotated as a unit with the output of the motor being taken from the shaft if such a construction is desired and if the mass to be moved does not seriously impair the speed at which it is desired to operate the motor. The manner of mounting such a rotating shaft is well known to those skilled in the art.

When the motor is operated at very high speeds, it may be desirable to provide for damping of the rotor when it reaches its new position following energization of a group of electromagnets in order to prevent oscillation of the rotor. This may be done electronically by providing another counter or by delaying the output of each stage of the counter and applying the delayed pulse to the previously energized group of electromagnets in order to retard the acceleration of the rotor just prior to the time it reaches its new position. Such damping also may be provided by mechanical means which are well known in the art. If a small amount of oscillation of the rotor can be tolerated, of course such damping provisions will not be necessary.

It further should be noted that the number of electromagnets forming the groups of electromagnets may be varied, the magnet pairs may be comprised of individual U-shaped magnets rather than forming each stator out of a single piece of magnetic material, and that the relationship between the number of spokes and the number of electromagnets in the stators may be varied.

Although the foregoing description has been limited to a specific embodiment of the invention, it will be apparent to those skilled in the art that various changes and modifications may be made in the motor of this invention without departing from the spirit and scope of the invention.

What is claimed is:

1. A stepping motor including:
a rotor having a plurality of spokes made of magnetic material with the spokes being equally angularly displaced from one another;
a stator having a plurality of electromagnets each comprising a pair of legs axially spaced from the rotor and radially arranged around the axis of the rotor, the degree of angular displacement between the legs of each electromagnet being the same as the degree of angular displacement of the spokes and the degree of angular displacement between legs of different pairs being different from the degree of angular displacement of the spokes; and
means for energizing the electromagnets according to a predetermined cyclic pattern.

2. A stepping motor including:
a rotor having a plurality of equally angularly displaced spokes made of material having a high magnetic permeability;
a stator on each side of the rotor arranged in coaxial relation to the rotor, each stator having a plurality of electromagnets each comprising a pair of legs axially spaced from the rotor and radially arranged about the axis of rotation of the rotor, the degree of angular displacement between the legs of each electromagnet being the same as the degree of angular displacement of the spokes and the degree of angular displacement between legs of different pairs being different from the degree of angular displacement of the spokes; and
means for sequentially energizing the electromagnets according to a predetermined cyclic pattern.

3. A stepping motor including:
a rotor having a plurality of equally angularly displaced spokes made of high magnetic permeability material;
a stator on each side of the rotor arranged in parallel coaxial relation to the rotor, each stator having a plurality of electromagnets each comprising a pair of legs axially spaced from the rotor and radially arranged about the axis of rotation of the rotor, the degree of angular displacement between the legs of each electromagnet being the same as the degree of angular displacement of the spokes, and the degree of angular displacement between legs of different pairs being different from the degree of angular displacement of the spokes, the electromagnets on opposite sides of the rotor being axially aligned with one another; and
means for sequentially energizing the electromagnets according to a predetermined cyclic pattern.

4. A stepping motor including:
a rotor having a plurality of equally angularly displaced spokes made of high magnetic permeability material;
a stator on each side of the rotor arranged in parallel coaxial relation to the rotor, each stator having a plurality of electromagnets each comprising a pair of legs axially spaced from the rotor and radially arranged about the axis of rotation of the rotor, the degree of angular displacement between the legs of each electromagnet being the same as the degree of angular displacement between adjacent spokes, and the degree of angular displacement between legs of different pairs being different from the degree of angular displacement between adjacent spokes, the electromagnets on opposite sides of the rotor being axially aligned with one another to form a plurality of sets of electromagnets, each set constituting two opposing, axially aligned electromagnets; and
means for sequentially energizing predetermined sets of the electromagnets according to a predetermined cyclic pattern, the electromagnets of an energized set forming a closed magnetic loop through a cooperating pair of rotor spokes.

5. A stepping motor including:
a rotor having a plurality of angularly displaced groups of spokes made of material having a high magnetic permeability;
a stator on each side of the rotor arranged in parallel coaxial relation to the rotor, each stator having a plurality of electromagnets each comprising a pair of legs axially spaced from the rotor and radially arranged about the axis of the rotation of the rotor with the electromagnets of each stator being axially aligned with like electromagnets on the opposite stator to form sets of electromagnets, each set comprising two oppositely aligned electromagnets;

means linking a plurality of sets of electromagnets together to form groups of electromagnets, the degree of angular displacement between the legs of the electromagnets of each group being the same as the degree of angular displacement between the corresponding spokes in each of the groups of spokes, with the degree of angular displacement between the legs of electromagnets of different groups being different from the degree of angular displacement between the spokes of different groups of spokes; and means for sequentially energizing predetermined groups of the electromagnets according to a predetermined cyclic pattern, the electromagnets of each set of an energized group forming a closed magnetic loop through corresponding rotor spokes of a cooperating group of spokes.

6. A stepping motor including:

a rotor having a plurality of equally angularly displaced spokes made of material having a high magnetic permeability;

a stator on each side of the rotor arranged in parallel coaxial relation to the rotor, each stator having a plurality of electromagnets each comprising a pair of legs axially spaced from the rotor and radially arranged about the axis of the rotation of the rotor, the degree of angular displacement between the legs of each electromagnet being the same as the degree of angular displacement between adjacent spokes and the degree of angular displacement between legs of adjacent pairs being different from the degree of angular displacement between adjacent spokes, with electromagnets on each stator being axially aligned with like electromagnets on the opposite stator to form sets of electromagnets, each set comprising two opposing axially aligned electromagnets;

means linking a plurality of sets of electromagnets together to form groups of electromagnets, the degree of angular displacement between the legs of the electromagnets of each group being an integral multiple of the degree of angular displacement between adjacent spokes, with the degree of angular displacement between the legs of electromagnets of different groups being different from an integral multiple of the degree of angular displacement between adjacent spokes; and means for sequentially energizing predetermined groups of the electromagnets according to a predetermined cycle pattern, the electromagnets of each set of an energized group forming a closed magnetic path through corresponding spokes of the rotor.

7. A stepping motor including:

a rotor having a plurality of equally angularly displaced spokes made of material having a high magnetic permeability;

a stator on each side of the rotor arranged in parallel coaxial relation to the rotor, each stator having a plurality of electromagnets each comprising a pair of legs axially spaced from the rotor and radially arranged about the axis of the rotation of the rotor, the degree of angular displacement between the legs of each electromagnet being the same as the degree of angular displacement between adjacent spokes and the degree of angular displacement between legs of adjacent pairs being different from the degree of angular displacement between adjacent spokes, with electromagnets on each stator being axially aligned with like electromagnets on the opposite stator to form sets of electromagnets, each set comprising two opposing axially aligned electromagnets;

means linking a plurality of sets of electromagnets together to form groups of electromagnets, the degree of angular displacement between the legs of the electromagnets of each group being an integral multiple of the degree of angular displacement between adjacent spokes, with the degree of angular displacement between the legs of electromagnets of different groups being other than an integral multiple of the degree of angular displacement between adjacent spokes;

a counter having a plurality of stages corresponding in number to the number of groups of electromagnets with the output of each stage being connected to a different group; and means for sequentially stepping the counter to provide an output from one stage at a time to energize the group of magnets connected to a stage whenever an output is obtained from that stage, the electromagnets of each set of an energized group forming a closed magnetic path through cooperating spokes of the rotor.

8. A stepping motor according to claim 7 wherein the counter is an electronic ring counter.

9. A stepping motor according to claim 7 wherein the counter is a reversible electronic ring counter.

10. A stepping motor for a telegraphic tape reader including:

a perforated tape feed wheel rotatably mounted on a fixed shaft and carrying a plurality of equally spaced tape feed pins on its outer periphery, the feed wheel having a plurality of equally angularly displaced spokes made of a material having a high magnetic permeability;

a stator on each side of the feed wheel arranged in parallel coaxial relation to the feed wheel, each stator having a plurality of electromagnets each comprising a pair of legs axially spaced from the feed wheel and radially arranged about the axis of the rotation of the feed wheel, the degree of angular displacement between the legs of each electromagnet being the same as the degree of angular displacement between adjacent spokes and the degree of angular displacement between legs of adjacent pairs being different from the degree of angular displacement between adjacent spokes, with electromagnets on each stator being axially aligned with like electromagnets on the opposite stator to form sets of electromagnets, each set comprising two opposing axially aligned electromagnets;

means linking a plurality of sets of electromagnets together to form groups of electromagnets, the degree of angular displacement between the legs of the electromagnets of each group being an integral multiple of the degree of angular displacement between adjacent spokes, with the degree of angular displacement between the legs of electromagnets of different groups being different from an integral multiple of the degree of angular displacement between adjacent spokes; and means for sequentially energizing predetermined groups of the electromagnets according to a predetermined cyclic pattern, the electromagnets of each set of an energized group forming a closed magnetic path through corresponding spokes of the feed wheel.

11. A stepping motor for a telegraphic tape reader including:

a perforated tape feed wheel rotatably mounted on a fixed shaft and carrying a plurality of equally spaced tape feed pins on its outer periphery, the feed wheel having a plurality of equally angularly displaced spokes made of a material having a high magnetic permeability;

a stator on each side of the feed wheel arranged in parallel coaxial relation to the feed wheel, each stator having a plurality of electromagnets each comprising a pair of legs axially spaced from the feed wheel and radially arranged about the axis of the rotation of the feed wheel, the degree of angular displacement between the legs of each electromagnet being the same as the degree of angular displacement between adjacent spokes and the degree of angular displacement between legs of adjacent pairs being different from the degree of angular displacement between adjacent spokes, with electromagnets on each stator being axially aligned with like electromagnets on the opposite stator to form sets of electromagnets, each set comprising two opposing axially aligned electromagnets;

means linking a plurality of sets of electromagnets together to form groups of electromagnets, the degree of angular displacement between the legs of the electromagnets of each group being an integral multiple of the degree of angular displacement between adjacent spokes, with the degree of angular displacement between the legs of electromagnets of different groups being other than an integral multiple of the degree of angular displacement between adjacent spokes;

a counter having a plurality of stages corresponding in number to the number of groups of electromagnets with the output of each stage being connected to a different group; and means for sequentially stepping the counter to provide an output from one stage at a time to energize the group of magnets connected to a stage whenever an output is obtained from that stage, the electromagnets of each set of an energized group creating a closed magnetic loop through cooperating spokes of the feed wheel.

12. A stepping motor according to claim 11 wherein the counter is an electronic ring counter.

13. A stepping motor according to claim 11 wherein the counter is a reversible electronic ring counter.

References Cited

UNITED STATES PATENTS

| | | | |
|---|---|---|---|
| 1,353,025 | 10/1920 | Chicken | 310—49 |
| 2,343,325 | 3/1944 | Ranseen | 310—46 |
| 3,134,917 | 5/1964 | Miller | 310—49 |
| 1,692,761 | 11/1928 | Osser | 310—46 |

MILTON O. HIRSHFIELD, *Primary Examiner.*

G. NUNEZ, *Assistant Examiner.*